(12) United States Patent
Houtman et al.

(10) Patent No.: US 8,234,873 B2
(45) Date of Patent: Aug. 7, 2012

(54) MULTI PASSAGE FUEL MANIFOLD AND METHODS OF CONSTRUCTION

(75) Inventors: Kenneth N. Houtman, Holland, MI (US); Fei Philip Lee, Holland, MI (US)

(73) Assignee: Woodward, Inc., Fort Collins, CO (US)

( * ) Notice: Subject to any disclaimer, the term of this patent is extended or adjusted under 35 U.S.C. 154(b) by 884 days.

(21) Appl. No.: 12/200,039

(22) Filed: Aug. 28, 2008

(65) Prior Publication Data

US 2010/0051726 A1    Mar. 4, 2010

(51) Int. Cl.
*F02C 1/00* (2006.01)
*F02G 3/00* (2006.01)
(52) U.S. Cl. .......... 60/739; 60/761; 60/762; 60/763; 60/764; 60/765; 60/766; 60/740
(58) Field of Classification Search .......... 60/739, 60/740, 761–766; 138/115–117
See application file for complete search history.

(56) References Cited

U.S. PATENT DOCUMENTS

| | | | |
|---|---|---|---|
| 5,205,115 A * | 4/1993 | Plemmons et al. | 60/806 |
| 6,038,852 A * | 3/2000 | Celi | 60/761 |
| 6,898,926 B2 * | 5/2005 | Mancini | 60/39.094 |
| 2005/0160717 A1 | 7/2005 | Sprouse et al. | |
| 2007/0006590 A1 | 1/2007 | Muldoon et al. | |
| 2007/0204622 A1 | 9/2007 | Patel et al. | |
| 2008/0000214 A1 | 1/2008 | Kothnur et al. | |
| 2008/0072599 A1 | 3/2008 | Morenko et al. | |
| 2008/0083223 A1 | 4/2008 | Prociw et al. | |
| 2008/0095611 A1 * | 4/2008 | Storage et al. | 415/116 |

FOREIGN PATENT DOCUMENTS

| | | |
|---|---|---|
| JP | 09-280073 | 10/1997 |
| JP | 2007010306 | 1/2007 |

* cited by examiner

*Primary Examiner* — William H Rodriguez
*Assistant Examiner* — Craig Kim
(74) *Attorney, Agent, or Firm* — Reinhart Boerner Van Deuren P.C.

(57) ABSTRACT

Integrally formed, multi zone fuel manifolds for gas turbine engines and methods of construction are provided. The fuel manifold includes a plurality of annular channel members positioned adjacent each other, aligned and coupled together at the inner and outer peripheral sides thereof, with each pair of channel members defining a separate fluid conduit or passage within the manifold assembly. The fuel manifold can be constructed of any number of stacked and secured channel members to provide a compact multi zone fuel manifold having the desired number of fluid conduits or passages with a minimum number of sealed joints.

20 Claims, 5 Drawing Sheets

MULTI PASSAGE FUEL MANIFOLD AND METHODS OF CONSTRUCTION

FIELD OF THE INVENTION

This invention generally relates to fuel delivery systems for combustion engines and more particularly to multichannel fuel manifolds for gas turbine engines.

BACKGROUND OF THE INVENTION

Gas turbine engines, of the type typically used in aircraft applications, include, in serial flow communication, a fan section, through which ambient air is drawn into the engine, a multistage compressor for pressurizing the incoming air, a combustion section, in which the high pressure air is mixed with atomized fuel and ignited, and a turbine section that extracts the energy from hot gas effluent to drive the compressor and fan, producing desired engine thrust. An augmentor is used primarily to provide extra thrust for relatively short periods of time, which may be required during e.g., takeoff and high speed maneuvers, and can also be included to increase the thrust generated by engine. To achieve this, the augmentor injects additional fuel into the exhaust gases exiting the turbine of the engine.

Accordingly, gas turbine engines include at least one internal fuel delivery manifold that is mounted inside or outside the engine casing to distribute fuel to both the main combustors of the engine and to the thrust augmentor section. A conventional fuel manifold system is typically formed as an annular ring so that it can be positioned outside the high temperature environment of the combustion areas, having at least one fuel inlet, and including a plurality of outlet connections configured to feed an array of nozzles, carburetors, fuel valves and/or spray bars and/or rings that extend into the combustion areas. Typically, fuel manifolds include more than one fuel conduit or tubes for feeding different nozzle systems, or for accommodating fuels at different pressure or flow rates. Fuel recirculation conduits, drains or cooling conduits can also be included within the annular fuel manifold configuration, as is well known in the art. The resulting multi-conduit fuel manifold system includes several annularly formed tubes that are nested together or oriented side-by-side relationship and joined together.

As will be appreciated, the more complex the fuel system requirements, the more complex the fuel manifold system construction. For example, where three or more separate fuel conduits are required by the application (to supply additional fuel nozzles, for cooling or for staging), the size and weight of the fuel manifold increases, decreasing overall fuel burning efficiency of the engine.

FIG. 1 illustrates a prior art gas turbine fuel manifold including three separate fuel delivery conduits that are secured together in a spaced apart fashion with mounting brackets. Each conduit includes multiple tubular components formed into a ring and welded or otherwise joined together. As illustrated, each of the assembled rings includes a significant number of joints. Each joint of the manifold requires proof testing and must be leak free and, accordingly, is subject to failure under the extreme operating conditions of the engine.

In light of the foregoing, there exists, therefore, a need in the art for multi zone or multichannel fuel manifolds for gas turbine engines that minimize the number of joints or connections required to form the manifold, thereby minimizing maintenance and minimizing the risk of manifold failure over the engines operating life. In addition, there is a need to reduce the size and weight of multi zone or multichannel to decrease the overall weight of the engine and size of the engine envelope. These and other advantages of the invention, as well as additional inventive features, will be apparent from the description of the invention provided herein.

BRIEF SUMMARY OF THE INVENTION

Accordingly, in one aspect, the present invention provides a multi zone fuel manifold with any number of separate internal partitions or passages integrally formed together in a single assembly, reducing not only the size of a multi zone fuel manifold of the prior art, but also minimizing the number of seams or joints required for construction. The fuel manifolds of the present invention can be incorporated into the fuel delivery systems for the main combustion areas of a gas turbine engine, the augmentor section thereof, or both.

In another aspect, the invention provides fuel manifolds for gas turbine engine or other combustion system requiring more than one fuel delivery passage, wherein the fuel manifold includes at least two annular channel members, with each annular channel member including at least one open recess formed therein, such that when a pair of channel members is aligned so that the open recess of each channel face each other and the channel members are secured together along their respective inner and outer peripheral edges, a fluid passage is formed. Each additional fuel passage or conduit required by the given combustion application is efficiently added by securing another annular channel to the configuration.

In yet another aspect, the invention provides multi passage fuel delivery manifolds comprising first and second U-shaped end channel members and a plurality of intermediate H-shaped channel members, with each U shaped end member including a single open recess and each H-shaped member including two, opposing open recesses, the channel members arranged to provide any number of integrated fluid passages within a single fuel manifold construction, with the number of passages formed being determined by the number of H-shaped intermediate channel members provided, and as a matter of design choice.

Accordingly, an additional aspect of the present invention includes providing methods for constructing multi zone or passage fuel delivery manifolds including forming a first and second U-shaped end members, the desired number of H-shaped intermediate channel members and arranging them to form the desired number of fluid passages and securing each pair of channel members together around their inner and outer peripheral edges. The method can include joining the members together along such mated edges by welding, brazing, or bonding.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

An integral multi zone fuel manifold 130 constructed in accordance with the teachings of the present invention is shown and described with reference to FIGS. 2 through 8. It will be appreciated that although the fuel manifold 130 is described with respect to use within a gas turbine engine 100, such application is intended as only one example of the type of engine or combustion system that can be utilized with the fuel manifold 130 of the present invention.

Figure 2:
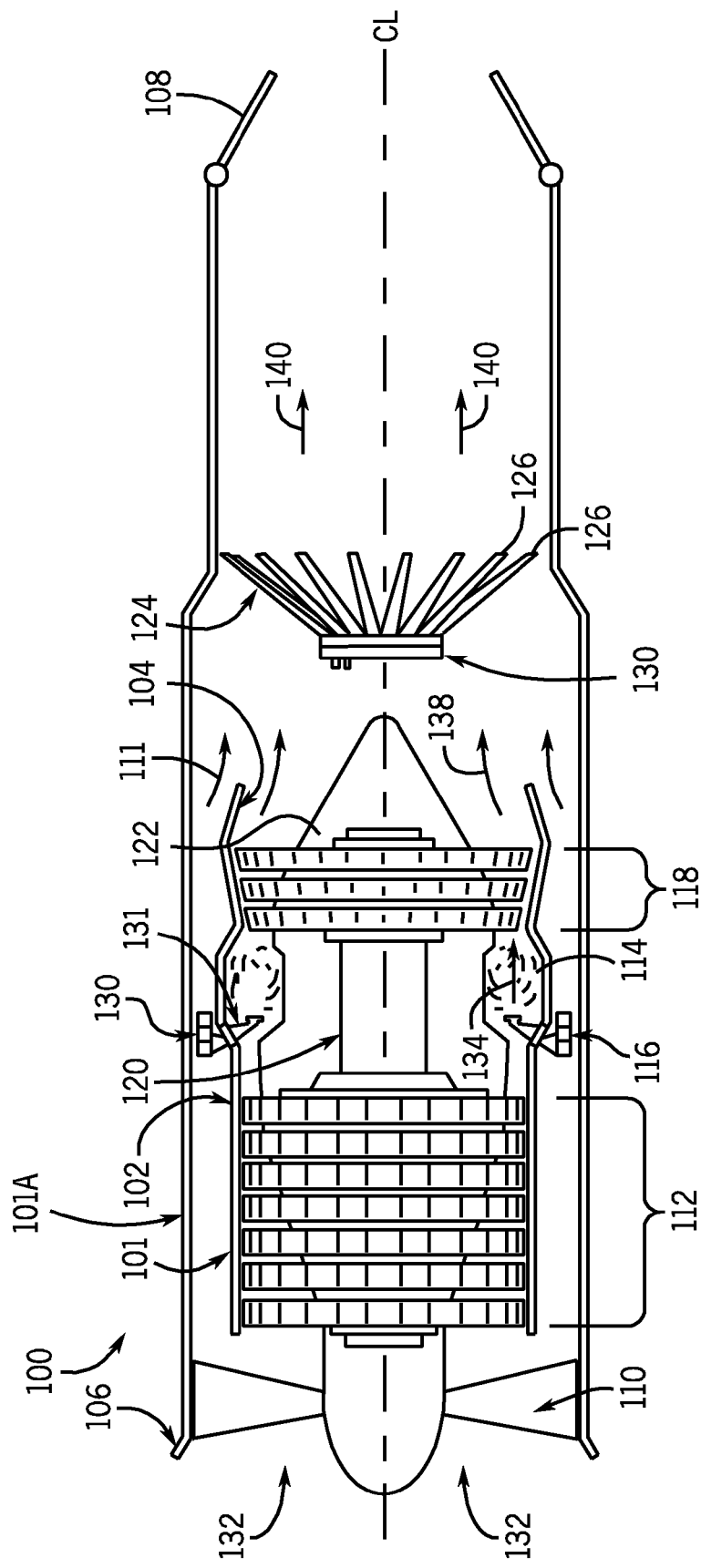
FIG. 2 is a cross sectional view of a gas turbine engine incorporating at least one multichannel fuel manifold in accordance with a particular aspect of the present invention.
Figure 4:
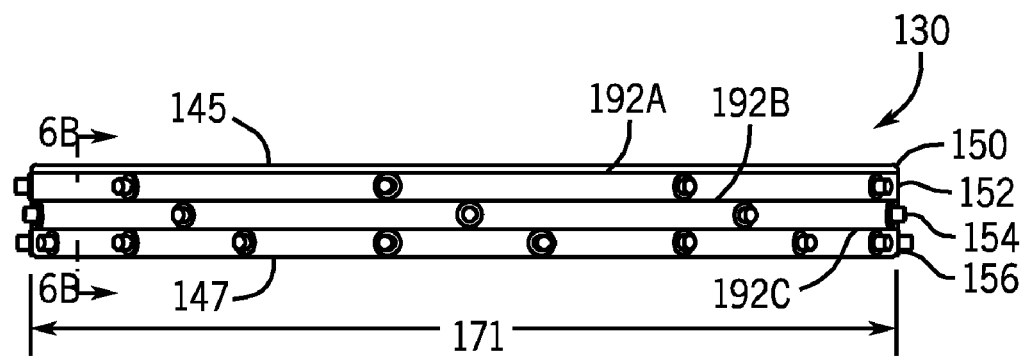
FIG. 4 is a side plan view of the multichannel fuel manifold illustrated in FIGS. 2 and 3.
Figure 5:
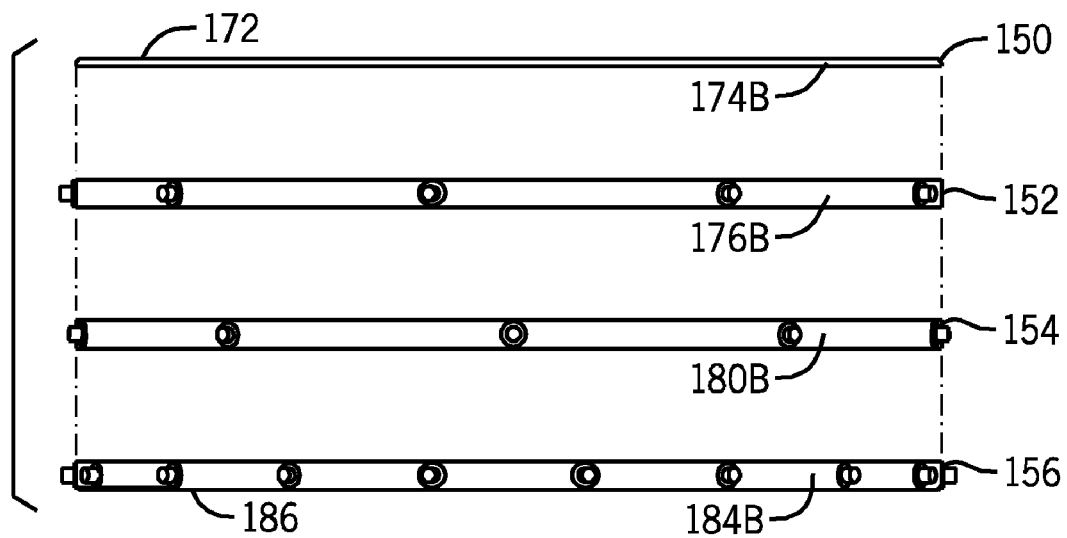
FIG. 5 is an exploded side view of the multichannel fuel manifold illustrated in FIGS. 2 through 4.

Turning first to FIG. 2, a cross sectional view of the gas turbine engine 100 incorporating the integrally formed, multichannel fuel manifold 130 constructed in accordance with the present invention is shown. In its simplest form, the turbine engine 100 includes a fan casing indicated generally at 101A, an inner engine core housing or casing 101 having an external surface 102, an engine exhaust casing, indicated generally at 104, an upstream or inlet end 106 and a downstream or outlet end 108. From the upstream end 106 to the downstream end 108, the turbine engine 100 includes a fan 110, a compressor section 112, a combustion chamber 114 including a fuel delivery system 116 which can comprise the fuel manifold 130 of the present invention and a turbine 118 having a shaft 120 operatively coupled to the fan 110 and the compressor section 112. The turbine 118 includes a hot gasses effluent nozzle vanes 122 at the downstream end thereof. A thrust augmentor section 124 including the fuel manifold 130 of the present invention and a plurality of spray bars or nozzles 124 is positioned downstream of the turbine exhaust casing 104.

As indicated by the arrows in FIG. 2, ambient air 132 is drawn into the turbine engine 100 by the fan 110, where it is pressurized in the multistage compressor section 112. Fuel is injected into the combustion chamber 114 from the fuel delivery system 116, which can include the fuel manifold 130 and fuel injector 131, as described in more detail below. The fuel air mixture is ignited to produce high temperature, high pressure, combustion gases 134. The high pressure gases 134 rapidly expand to drive the blades of the turbine 118, which in turn, powers the compressor 112 and fan 110 via the output shaft 120. Hot exhaust gases 138 exit the turbine through the nozzle 122 and mixes with the fan air flow 111. When required, additional fuel is supplied to the gas stream and by the augmentor section 124 and ignited, providing additional thrust to the exiting gas stream 140.

Turning next to FIGS. 3 through 6, a representative embodiment of the multichannel fuel manifold 130 in accordance with the present invention is illustrated. The fuel manifold 130 is substantially circular or ring shaped, having a central opening 146, an outer peripheral surface, indicated generally at 142, an inner peripheral surface, indicated generally at 144, and opposing side ends 145 and 147. The fuel manifold 130 has an inner diameter indicated at 170 and an outer diameter indicated at 171. As will be appreciated, the opening 146 in the fuel manifold 130 can be configured to permit the fuel manifold 130 to encompass the combustion chamber 114 of the engine 100, when the fuel manifold 130 is incorporated into the main fuel delivery system 116 thereof. It will be appreciated that the fuel manifold 130 can include extending flanges or lugs (not shown) to mount the fuel manifold 130 to engine core casing 102 of the engine 100.

Figure 6A:
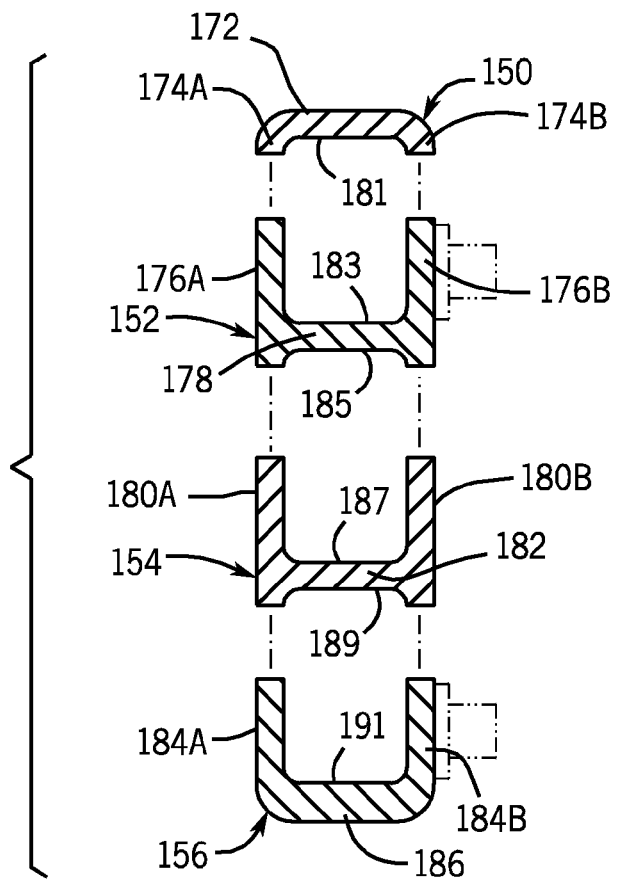
FIG. 6A is an exploded, cross sectional view of the multichannel fuel manifold illustrated in FIGS. 2 through 5.
Figure 6B:
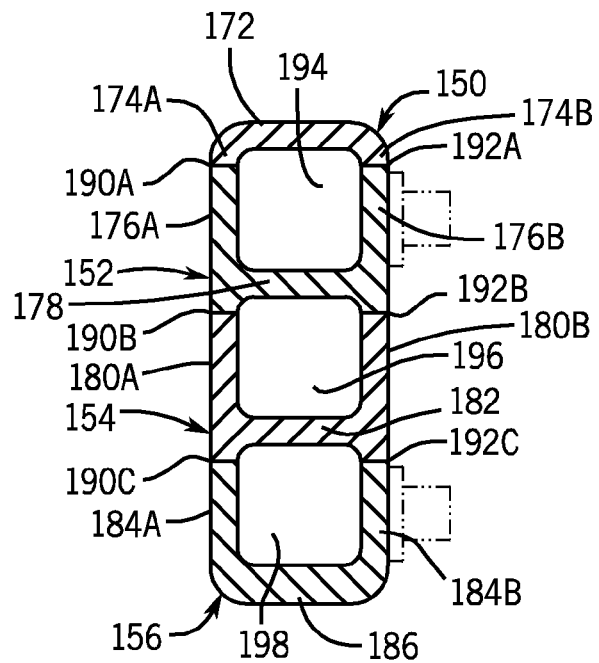
FIG. 6B is a sectional view of the assembled multichannel fuel manifold illustrated in FIGS. 2 through 6A, taken along the line 6B-6B in FIG. 4.

As best illustrated in FIGS. 6A and 6B, the fuel manifold 130 includes a plurality of annular channel members 150, 152, 154 and 156 arranged in an aligned and stacked configuration to provide three enclosed fuel passages or conduits 194, 196 and 198. In the embodiment illustrated in FIGS. 3 through 6B, the fuel manifold 130 includes first and second end channel members, 150 and 156, and two intermediate channel members 152 and 154 secured therebetween.

The first end channel member 150 is generally circular or ring-shaped having inner and outer diameters 170 and 171, respectively. The channel member 150 has a substantially U-shaped cross section including a flat portion 172 and a first, inner arm 174A extending downwardly from one end thereof and a second, outer arm 174B extending downwardly from the other end thereof. The inner arm 174A will be oriented on the inner peripheral surface 144 of the fuel manifold 130 and the outer arm 174B will be oriented on the outer peripheral surface 144 of the fuel manifold 130 when the manifold 130 is assembled. Together the flat portion 172 and arms 174A and 174B define an open recess 181 that is preferably substantially uniform in width and depth around the entire circumference of the channel member 150.

Channel member 152 is also generally circular or ring-shaped having inner and outer diameters 170 and 171, respectively. However, the channel member 152 is substantially H-shaped in cross section and includes a first, inner arm 176A and a second, outer arm 176B and a flat portion 178 disposed substantially perpendicular therebetween. The inner arm 176A will be oriented on the inner peripheral surface 144 of the fuel manifold 130 and the outer arm 176B will be oriented on the outer peripheral surface 142 of the fuel manifold 130 when the manifold 130 is assembled. Together the flat portion 178 and arms 176A and 176B define first and second open recesses 183 and 185 that are each substantially uniform in width and depth around the entire circumference of the channel member 152. In certain preferred embodiments of the present invention, the first recess 183 has a larger depth than the second recess 185, as illustrated in FIG. 6A. Further, it will be appreciated that the recess 183 of the channel member 152 is preferably substantially the same width as the recess 181 in the end channel member 150.

Like channel member 152, channel member 154 is substantially circular or ring-shaped having inner and outer diameters 170 and 171, respectively and substantially H-shaped in cross section. The channel member 154 includes an inner arm 180A, which will be oriented on the inner peripheral surface 144 of the fuel manifold 130 when the manifold 130 is assembled, a second, outer arm 180B, which will be oriented on the outer peripheral surface 142 of the fuel manifold 130 when the manifold 130 is assembled and a flat portion 182 disposed substantially perpendicular therebetween. Together the flat portion 182 and arms 180A and 180B define first and second recesses 187 and 189 that are each substantially uniform in width and depth around the entire circumference of the channel member 154. In certain preferred embodiments of the present invention, the first recess 187 has a larger depth than the second recess 189, as illustrated in FIG. 6A. Further, it will be appreciated that the recess 187 of the channel member 154 is preferably substantially the same width as the recess 185 in the end channel member 152.

The end channel member 156 is substantially is circular or ring-shaped having inner and outer diameters 170 and 171, respectively. The end channel member is substantially U shaped in cross section having a flat portion 186 and a first, inner arm 184A extending upwardly from one end thereof and a second, outer arm 184B extending upwardly from the other end thereof. The inner arm 184A will be oriented on the inner peripheral surface 144 of the fuel manifold 130 and the outer arm 184B will be oriented on the outer peripheral surface 142 of the fuel manifold 130 when the manifold 130 is assembled. Together the flat portion 186 and arms 184A and 184B define a recess 191 that is substantially uniform in width and depth around the entire circumference of the channel member 156. Further, it will be appreciated that the recess 191 of the channel member 156 is preferably substantially the same width as the recess 189 in the end channel member 154.

In certain preferred embodiments of the present invention, each channel members 150, 152, 154 and 156 is formed of a single piece of material. In particular, each channel member 150, 152, 154 and 156 can be formed as described by a turning process, for example, by applying a tool, such as a bit to the surface of the channel material to form the desired channel recess, as is well known to those skilled in the art. It will be understood that the channel members 150, 152, 154 and 156 can be machined or formed by any process known to those skilled in the art.

As such, as illustrated in FIGS. 3 through 6B, the present invention also includes, methods for constructing the multichannel fuel manifold 130. In particular, the method includes forming each of the channel members 150, 152, 154 and 156, as described herein, from preferably a single piece of material, in order to minimize the number of total seals formed during construction of the present invention. Further, it will be appreciated that the material of construction of the manifold can be selected based on the application system requirements, including, but not limited to temperature, pressure, flow rates required, type of fuel utilized, placement and orientation of the manifold within the application environment and/or other operating conditions.

The fuel manifold 130 is then assembled by positioning the end channel member 150 adjacent to the intermediate channel 152 so that each of the open recesses 181 and 183 are disposed facing each other. The arms 174A and 174B of the end channel member 150 are mated to and aligned with the arms 176A and 176B of the intermediate channel member 152, respectively, as illustrated in FIG. 6B. It will be appreciated that the arms 174A and 174B of the end channel member 150 and the arms 176A and 176B of the channel member 152 are preferably formed to flushly abut each other around the entire circumference thereof, or can otherwise be configured to engagedly fit together. The channel members 150 and 152 are coupled together at the outer arms 174B and 176B around the entire outer peripheral surface 142 thereof, forming an outer peripheral seal 192A. The inner arms 174A and 176A of the channels 150 and 152 are secured together around the entire inner peripheral surface 144 thereof, forming an inner peripheral seal 190A. As such, the recesses 181 and 183 in each of channels 150 and 152, respectively, cooperate to form the fuel or fluid passage 194.

Figure 3:
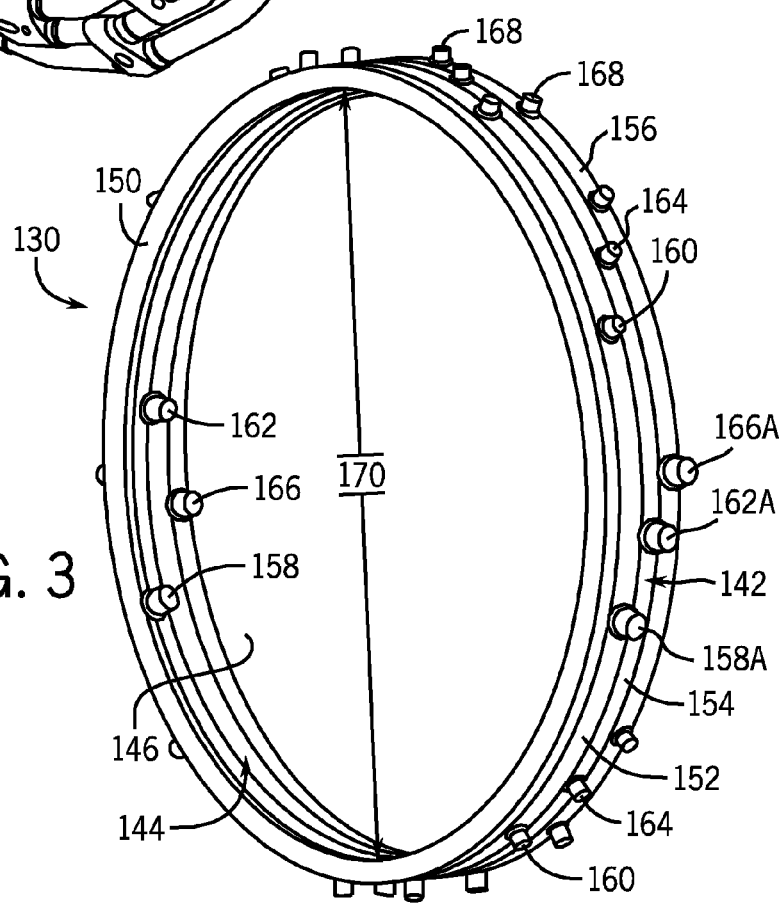
FIG. 3 is a perspective view of the multichannel fuel manifold illustrated in FIG. 2.

The fuel passage 194 can be provided with an inlet or in feed connection 158 or 158A, as illustrated in FIG. 3, by drilling or otherwise forming an opening within the inner arm 176A or outer 176B arm of the channel 152 and securing an inlet supply valve linkage thereover, as is well known in the art. Further, a plurality of spaced apart outlets, nozzles, spray bar connections 160 or the like can be provided in the fuel passage 194 by drilling or otherwise forming an opening within the inner or outer arm 176A or 176B of the channel 152, as is well known to those in the art.

The intermediate channel member 154 is positioned adjacent to the channel member 152 so that each of the open recesses 185 and 187 are disposed facing each other. The arms 180A and 180B of the intermediate channel member 154 are aligned with and mated to the arms 176A and 176B of the channel 152. It will be appreciated that the arms 180A and 180B of the channel 154 and the arms 176A and 176B of the channel 152 are preferably formed to flushly abut each other around the entire circumference thereof, or can otherwise be configured to engagedly fit together. The channel members 152 and 154 are secured together at the inner arms 176A and 180A around the entire inner peripheral surface 144 thereof, forming an inner peripheral seal 190B. The outer arms 176B and 180B of the channels 152 and 154 are secured together around the entire outer peripheral surface 142 thereof, forming an outer peripheral seal 192B. As such, the recesses 185 and 187 in each of the channels 152 and 154, respectively, cooperate to form the fuel or fluid passage 196.

The fuel passage 196 can be provided with an inlet or in feed connection 162 or 162A, as illustrated in FIG. 3, by drilling or otherwise forming an opening within the inner or outer arms 180A or 180B of the channel 154 and securing an inlet supply valve linkage thereover, as is well known in the art. Further, a plurality of spaced apart outlets, nozzles, spray bar connections 164 or the like can be provided in the fuel passage 196 by drilling or otherwise forming an opening within the inner or outer arms 180A or 180B of the channel 154, as is well known to those in the art.

Likewise, the end channel member 156 is positioned adjacent to the intermediate channel member 154 so that each of the open recesses 189 and 191 are disposed facing each other. The arms 184A and 184B of the U-shaped end channel member 156 are aligned with and mated to the arms 180A and 180B of the channel member 154. It will be appreciated that the arms 180A and 180B of the channel 154 and the arms 184A and 184B of the channel 156 are preferably formed to flushly abut each other around the entire circumference thereof, or can otherwise be configured to engagedly fit together. The channel members 154 and 156 are secured together at the inner arms 180A and 184A around the entire inner peripheral surface 144 thereof, forming an inner peripheral seal 190C. The outer arms 180B and 184B of the channels 154 and 156 are secured around the entire outer peripheral surface 142 thereof, forming an outer peripheral seal 192C. As such, the recesses 189 and 191 in each of the channels 154 and 156, respectively, cooperate to form the fuel or fluid passage 198.

The fuel passage 198 can be provided with an inlet or in feed connection 166 or 166A, as illustrated in FIG. 3, by drilling or otherwise forming an opening within the inner or outer arms 184A or 184B of the channel 156 and securing an inlet supply valve linkage thereover, as is well known in the art. Further, a plurality of spaced apart outlets, nozzles, spray bar connections 168 or the like can be provided in the fuel passage 198 by drilling or otherwise forming an opening within the outer or inner arms 184B or 184A of the channel 156, as is well known to those in the art.

The channel members 150, 152, 154 and 156 can be secured together by any means known to those skilled in the art, and determined, at least in part, by the materials of construction and end use application of the fuel manifold 130. In particular, the channel members can be joined together to form the fuel manifold 130 of the present invention by brazing, welding, bonding or by another fastening or sealing method.

It will be appreciated that each of the fluid or fuel passages 194, 196 and 198 within the fuel manifold 130 are substantially the same width and depth, and are positioned within the manifold 130 to be aligned, as illustrated in FIG. 6B. However, consistent with the broader aspects of the present invention, the fuel passages 194, 196 and 198 can vary by size with respect to each other, depending on the desired fuel supply requirements and end use application.

Figure 1:
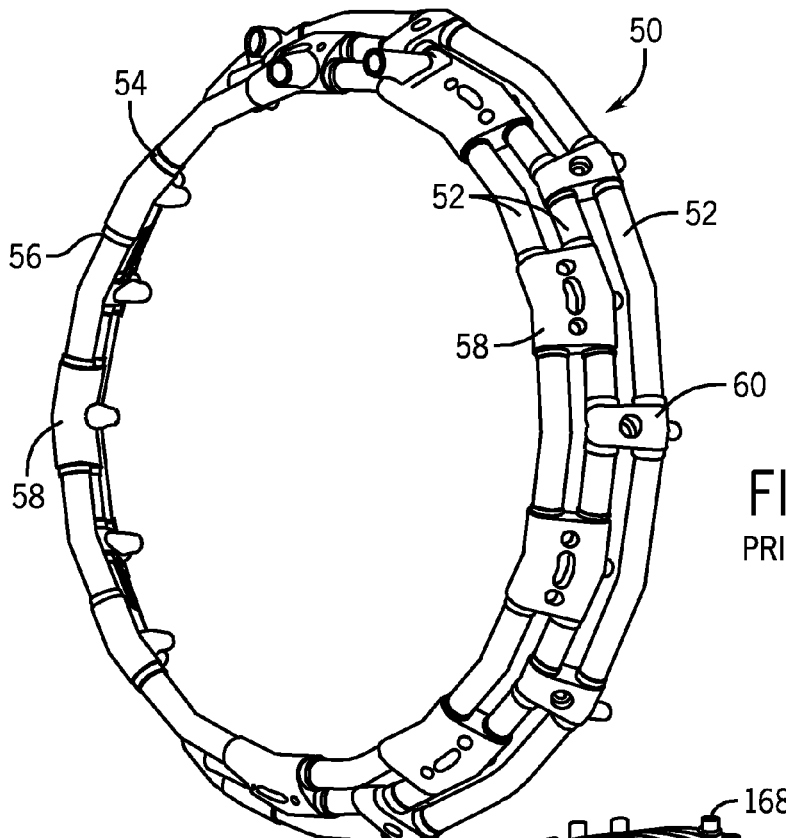
FIG. 1 is a perspective view of a prior art fuel manifold.

Turning for the moment to FIG. 1, a prior art fuel manifold 50 is shown having three distinct fluid conduits 52 secured together in a spaced relationship by the brackets 58 and 60. It can be seen that each fluid conduit is formed of a plurality of tubular pieces joined together at seams or welds 54 and 56 to form the annular shape of the manifold 50. The prior art fuel manifold 50, as illustrated, includes at least about ninety joints or seams.

Unlike the prior art manifold 50 in FIG. 1, the fuel manifold 130 contains a significantly smaller number of joints or seams. In particular, the three passage fuel manifold 130 illustrated in FIGS. 2 through 6, includes only six circumferential seams. Accordingly, the time and expense required to manufacture and test the assembled fuel manifold 130 is significantly reduced, compared to that of the prior art. Moreover, because the channel members 150, 152, 154 and 156 are configured to mate with and secure together in an aligned or stacked arrangement, each of the fuel passages 194, 196 and 198 are formed into a single, compact and integrated construction that is of a lighter weight than previous designs. This integrated design provides the manifold 130 with an axially symmetrical construction. The resulting fuel manifold 130 is more durable and vibration resistant compared to alternate constructions.

Figure 7:
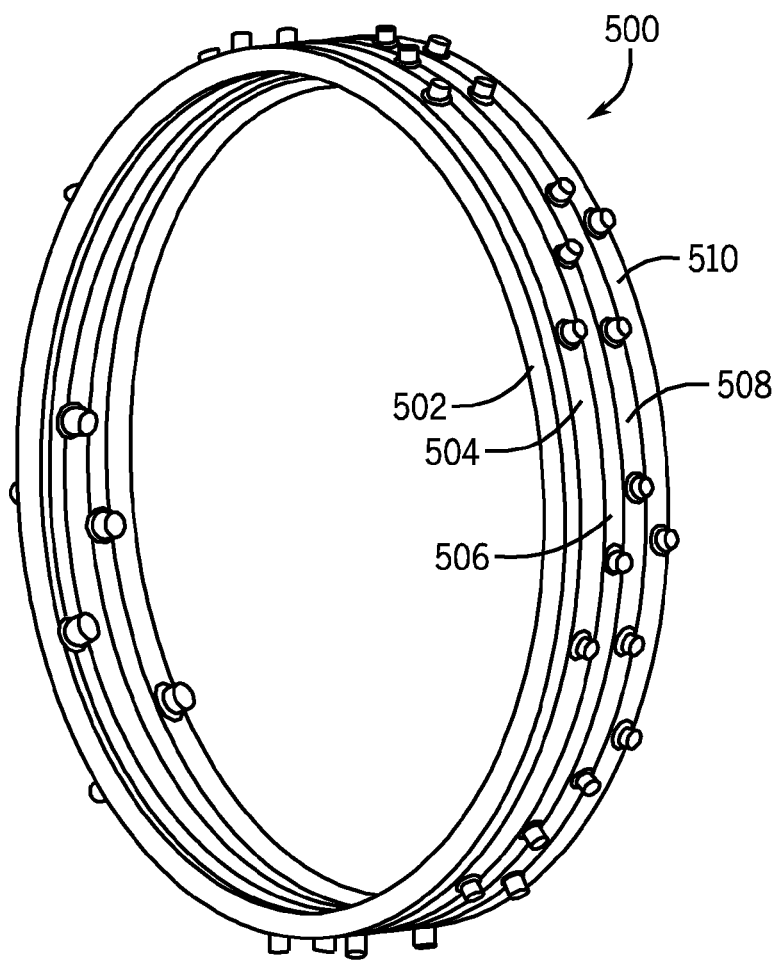
FIG. 7 is a perspective view of an additional embodiment of a multichannel fuel manifold constructed in accordance with the present invention, formed to include four internal fuel passages or conduits.
Figure 8:
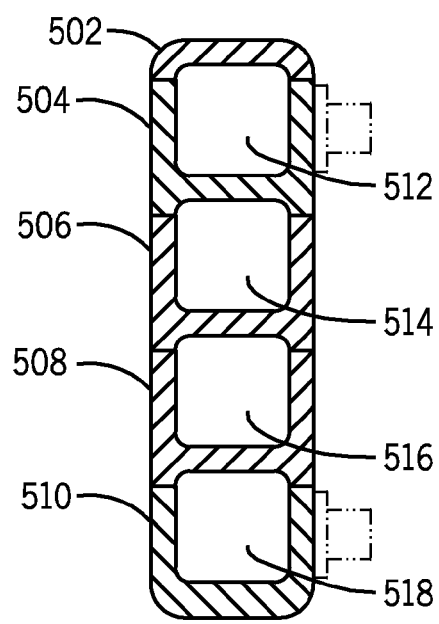
FIG. 8 is a sectional view of the assembled multichannel fuel manifold illustrated in FIG. 7.

In the arrangement illustrated in FIGS. 2 through 6, three fuel channels or passages are formed by the stacked channel members 150, 152, 154 and 156. However, consistent with the broader aspects of the present invention, any number of channels can be provided in the manifold 130. For example, additional cooling and/or recirculation passages may be required by the combustion application. As such, FIGS. 7 and 8 illustrate another embodiment of a multichannel fuel manifold 500 of the present invention. The manifold 500 includes a U shaped end member 502 constructed in a similar manner to the channel member 150, three, stacked H channel members 504, 506 and 508 constructed in a like manner to the H channel members 152 and 154 described above, and a U shaped end channel member 510 constructed in like manner to the end channel 156. Each pair of channel members defines a fluid passage or conduit 512, 514, 516 and 518.

Turning back to FIG. 2 for the moment, the gas turbine engine 100 can include the fuel manifold 130 or 500 of the present invention within the fuel delivery system 116 of the main engine combustion section, and/or the augmentor section 124 thereof. The fuel manifold construction 130 and 500 is substantially axially symmetrical, and thus, easier to manufacture and install within the engine housing 101.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fuel manifold for a gas turbine engine comprising:
   a first annular end channel member having an inner peripheral edge, an outer peripheral edge and an elongated, open recess formed therebetween;
   at least one intermediate annular channel member having an inner peripheral edge, an outer peripheral edge, and first and second opposing open, elongated recesses formed therebetween, wherein the at least one intermediate channel member is secured to the first end channel member along the inner peripheral edges and outer peripheral edges thereof, respectively, wherein the open recess in the end channel member and the first open recess of the intermediate channel member are disposed facing each other and cooperate to define a first enclosed fluid passage; and
   a second annular end channel member having an inner peripheral edge, an outer peripheral edge and an elongated, open recess formed therebetween, wherein the second annular end channel member is secured to the intermediate channel member along each of the inner peripheral edge and outer peripheral edge thereof, respectively, wherein the second open recess of the intermediate channel member faces the open recess of the second end channel member to define an additional enclosed fluid passage.

2. The fuel manifold of claim 1, wherein the first and second annular channel members are substantially U-shaped, each including first and second arms and a flat portion positioned therebetween, wherein a continuous inner surface of the first arm, the flat portion and the second arm defines the open recess therein.

3. The fuel manifold of claim 1, wherein the at least one intermediate channel member is substantially H-shaped, each including first and second arms and a flat portion positioned therebetween, wherein a first continuous inner surface of the first arm, the flat portion and the second arm defines the first open recess therein and wherein a second continuous inner surface of the first arm, the flat portion and the second arm defines the second open recess therein.

4. The fuel manifold of claim 1, wherein the open recess of the first end channel member is the same width dimension as the first open recess of the at least one intermediate channel member.

5. The fuel manifold of claim 1, wherein the open recess of the second end channel member is the same width dimension as the second open recess of the at least one intermediate channel member.

6. The fuel manifold of claim 1, wherein the first open recess of the at least one intermediate channel member has a greater depth dimension than the second open recess of the at least one intermediate channel member.

7. The fuel manifold of claim 1, wherein each of the enclosed fluid passages have substantially similar width and depth dimension and are substantially aligned within the assembled fuel manifold.

8. The fuel manifold of claim 1, wherein each of the first and second end channel members and each of the at least one intermediate channel members are formed of a single piece of material.

9. The fuel manifold of claim 1, wherein the first end channel member, the at least one intermediate channel member and the second end channel member are secured together along each of the inner peripheral edges by one of welding, brazing and bonding, and wherein the first end channel member, the at least one intermediate channel member and the second end channel member are secured together along each of the outer peripheral edges thereof by one of welding, brazing and bonding.

10. The fuel manifold of claim 1, wherein two intermediate channel members are provided, wherein the first intermediate annular channel member has an inner peripheral edge, an outer peripheral edge, and first and second opposing open, elongated recesses formed therebetween, wherein the first intermediate channel member is secured to the first end channel member along the inner peripheral edges and outer peripheral edges thereof, respectively, wherein the open recess in the end channel member and the first open recess of the first intermediate channel member are disposed facing each other and cooperate to define the first enclosed fluid passage; and wherein the second intermediate annular channel member has an inner peripheral edge, an outer peripheral edge, and first and second opposing open, elongated recesses formed therebetween, wherein the second intermediate channel member is secured to the first intermediate channel member along the inner peripheral edges and outer peripheral edges thereof, respectively, and wherein the second open recess in the first intermediate channel member and the first open recess of the second intermediate channel member are disposed facing each other and cooperate to define a second enclosed fluid passage.

11. The fuel manifold of claim 1, wherein the first end channel member, the at least one intermediate channel member and the second end channel member are secured together to provide four enclosed fluid channels.

12. The fuel manifold of claim 1, further comprising at least one inlet provided in each of the first and second enclosed fluid passages, and at least one outlet provided in each of the first and second enclosed fluid passages.

13. A multi zone fuel delivery manifold for use in a main combustor or fuel augmentor for a gas turbine engine, the multi zone fuel delivery manifold comprising:
a first end member formed in the shape of a ring having an inner circumferential edge and an outer circumferential edge, the first end member having a substantially U-shaped cross section defining an open recess;
an intermediate member formed in the shape of a ring having an inner circumferential edge and an outer circumferential edge, the intermediate member having a substantially H-shaped cross section defining a first open recess and a second open recess, the inner circumferential edge of the intermediate member sealingly joined to the inner circumferential edge of the first end member and the outer circumferential edge of the intermediate member sealingly joined to the outer circumferential edge of the first end member forming a first fluid passage; and
a second end member formed in the shape of a ring having an inner circumferential edge and an outer circumferential edge, the second end member having a substantially U-shaped cross section defining an open recess; wherein the inner circumferential edge of the second end member is sealingly joined to the inner circumferential edge of the intermediate member and the outer circumferential edge of the second end member is sealingly joined to the outer circumferential edge of the intermediate member forming a second fluid passage.

14. The multi zone fuel delivery manifold of claim 13, wherein the first end member, the intermediate member and the second end member have substantially similar inner diameter dimensions and outer diameter dimensions such that the fuel deliver manifold is provided with substantially smooth inner and outer peripheral surfaces.

15. The multi zone fuel delivery manifold of claim 13, wherein the first end member, the intermediate member and the second end member are secured together by one of welding, brazing and bonding.

16. The multi zone fuel delivery manifold of claim 13, further comprising at least one inlet provided in each of the first and second enclosed fluid passages, and at least one outlet provided in each of the first and second enclosed fluid passages.

17. The multi zone fuel delivery manifold of claim 13, further comprising;
a second intermediate member formed in the shape of a ring having an inner circumferential edge and an outer circumferential edge, the second intermediate member having a substantially H-shaped cross section defining a first open recess and a second open recess, wherein the second intermediate member is secured within the manifold between the first intermediate member and the second end member.

18. A method for constructing a multi passage fuel manifold, the method comprising:

forming first and second end ring-shaped end members, each end member having an inner circumferential edge and an outer circumferential edge and an open recess formed therebetween;

forming at least one ring-shaped intermediate member including an inner circumferential edge and an outer circumferential edge and having a first open recess and a second, opposite open recess formed therebetween;

securing the at least one intermediate member to the first end member along their respective inner circumferential edges and outer circumferential edges, wherein the open recess in the end member and the first open recess of the at least one intermediate channel member are disposed facing each other and cooperate to define a first enclosed fluid passage; and securing the second end member to the at least tone intermediate member along their respective inner circumferential edges and outer circumferential edges, wherein the open recess in the second end member and the second open recess of the at least one intermediate channel member are disposed facing each other and cooperate to define a second enclosed fluid passage.

19. The method of claim 18, wherein the members are secured together by one of welding, brazing and diffusion bonding.

20. The method of claim 18, further comprising providing at least one inlet and at least one outlet in each of the first and second enclosed fluid passages.

* * * * *